Oct. 31, 1967  A. G. GROSS, JR  3,349,597
METHOD OF PRODUCING BERYLLIUM WIRE
Original Filed Aug. 23, 1961  4 Sheets-Sheet 1

INVENTOR.
ALFRED G. GROSS, JR.
BY
his ATTORNEY.

Oct. 31, 1967   A. G. GROSS, JR   3,349,597
METHOD OF PRODUCING BERYLLIUM WIRE
Original Filed Aug. 23, 1961   4 Sheets-Sheet 2

INVENTOR.
ALFRED G. GROSS JR.
BY
John H. Leonard
his ATTORNEY.

INVENTOR.
ALFRED G. GROSS JR.
BY
ATTORNEY.

United States Patent Office 3,349,597
Patented Oct. 31, 1967

3,349,597
METHOD OF PRODUCING BERYLLIUM WIRE
Alfred G. Gross, Jr., Avon Lake, Ohio, assignor to The Brush Beryllium Company, Cleveland, Ohio, a corporation of Ohio.
Original application Aug. 23, 1961, Ser. No. 133,345. Divided and this application May 26, 1965, Ser. No. 481,993
15 Claims. (Cl. 72—286)

This is a division of application Ser. No. 133,345, filed Aug. 23, 1961, now abandoned.

The present invention relates to a method for drawing beryllium into wire.

Beryllium is a light, high temperature, non-ferrous metal, the strength to weight ratio, melting point, specific heat, and electrical and thermal conductivity of which have, in recent years, aroused considerable interest in the aircraft and missile fields. For every pound saved in the construction of a space vehicle the overall payload may be increased proportionately, hence, weight is a prime factor. Wherever beryllium is used in the above-mentioned fields, enormous savings in weight may be had due to its high strengths to weight ratio as compared to other metals and alloys used for like purposes.

Beryllium today, as a result of some of its unusual characteristics, is being used in several applications; for example, aircraft brake discs, missile nose cones and re-entry bodies, and machined parts.

Recently, increased interest in the wire wrapped pressure vessel field has presented the question as to whether or not beryllium wire could be manufactured in commercial lengths and substituted for the fine high strength steel wire presently being used to fabricate pressure vessel structural shells, thereby forming light weight rocket cases.

Some attempts have been made in the past to draw beryllium into wire, but these have proven unsuccessful. Other attempts have been made to perfect a swaging process to produce beryllium wire, but these have also been unsuccessful.

The present invention provides a method of drawing beryllium metal into wire economically. Such method employs, for the most part, basic drawbench equipment, well-known in the wire-drawing art, although capstan-block, multiple-draft machines, each modified as disclosed herein, may be used.

Therefore, the primary object of this invention is to provide a method of producing drawn beryllium wire, including ductile beryllium wire, beryllium wire in the fine wire range, and beryllium wire in the high strength range of from about 150,000 p.s.i. upwardly, and particularly to such beryllium wires in commercial lengths, that is, capable of being wound on reels or into coils for storage and subsequent use.

Another object is to draw beryllium wire through a die directly from a starting material, such as block-pressed beryllium, or warm or hot extruded beryllium rods, without intermediate working, such as swaging from rod to wire.

Still another object is to draw the metal beryllium into wire at an elevated temperature.

Another important object is to accurately control the temperature of the wire at locations along its length during the drawing operation.

Early methods of manufacturing wire of metals other than beryllium were relatively crude, the art remaining stationary for an exceedingly long period of time. The early practices varied in different localities; indeed, the wire drawer even made his own lubricant, the composition of which was treated as a trade secret. It was not until the science of metallurgy advanced, that improvements in this field were made. Such improvements in methods of handling, cleaning, coating, and lubricating, along with heat treating and finishing, have accordingly advanced the art to its present state of development.

Beryllium is a relatively new metal and its behavior is generally unique, and is unpredictable from the behavior of any one or more metals of the refractory, or, of the light, high temperature, non-ferrous type. Consequently, a great many unexpected problems, resulting from factors then unknown, had to be solved before the beryllium wire of the present invention could be produced.

The known methods of beryllium fabrication to produce sheets, shapes, and castings did not indicate procedures for drawing beryllium wire. On the contrary, the prior fabrication methods indicated that limited ductility, if not extreme brittleness of the metal would present such a serious problem if the metal were subjected to tensile stresses, that the likelihood of successfull drawing of the beryllium into wire of commercial lengths could not be expected.

The present invention advances the beryllium fabrication art to the extent of providing, as a new article of manufacture, drawn beryllium wire, including also drawn beryllium wire in the fine wire range, drawn beryllium wire of high strength, and ductile drawn beryllium wire, and reliable methods for the commercial and economical production of each of them in quantity.

These and incidental objects and advantages will become apparent from the following detailed description and explanation of the invention, wherein reference is made to the accompanying drawings, in which.

The present-day fabrication techniques used for producing beryllium shapes fall into two categories; viz., those conducted at temperatures above the recrystallization zone, and those at lower temperatures but above the blittle-ductile transition zone.

The higher temperature method, usually about 1950° F., works well in the extrusion and other forming operations that depend principally upon compressive or shear stresses. Such an operating temperature for drawing beryllium wire, where tensile stresses are encountered, is unsatisfactory and unreliable since beryllium at said temperature has low cohesive strength.

In the extrusion process, tri-axial compression is encountered, that is, radial, tangential, and longitudinal compressive stresses are active. In the drawing process, bi-axial compression and uni-axial tension stresses are involved, that is, radial and tangential compressive stresses along with longitudinal tension are active.

According to the present invention, beryllium is drawn by a plurality of passes, each within a temperature range of from about 600° F. to about 950° F., and preferably from about 750° F. to about 800° F., high reductions being made per pass, and further, high cumulative reductions being made between thermal treatments. By working within this limited temperature range, advantage may be taken of a high percent of elongation and of reduction in area, as hereinafter indicated.

Since temperature is a critical component to a successful drawing operation, temperature control must be accurate. Therefore portions of the equipment must be capable of operating at elevated temperatures for periods of long duration.

Figures 1, 9:
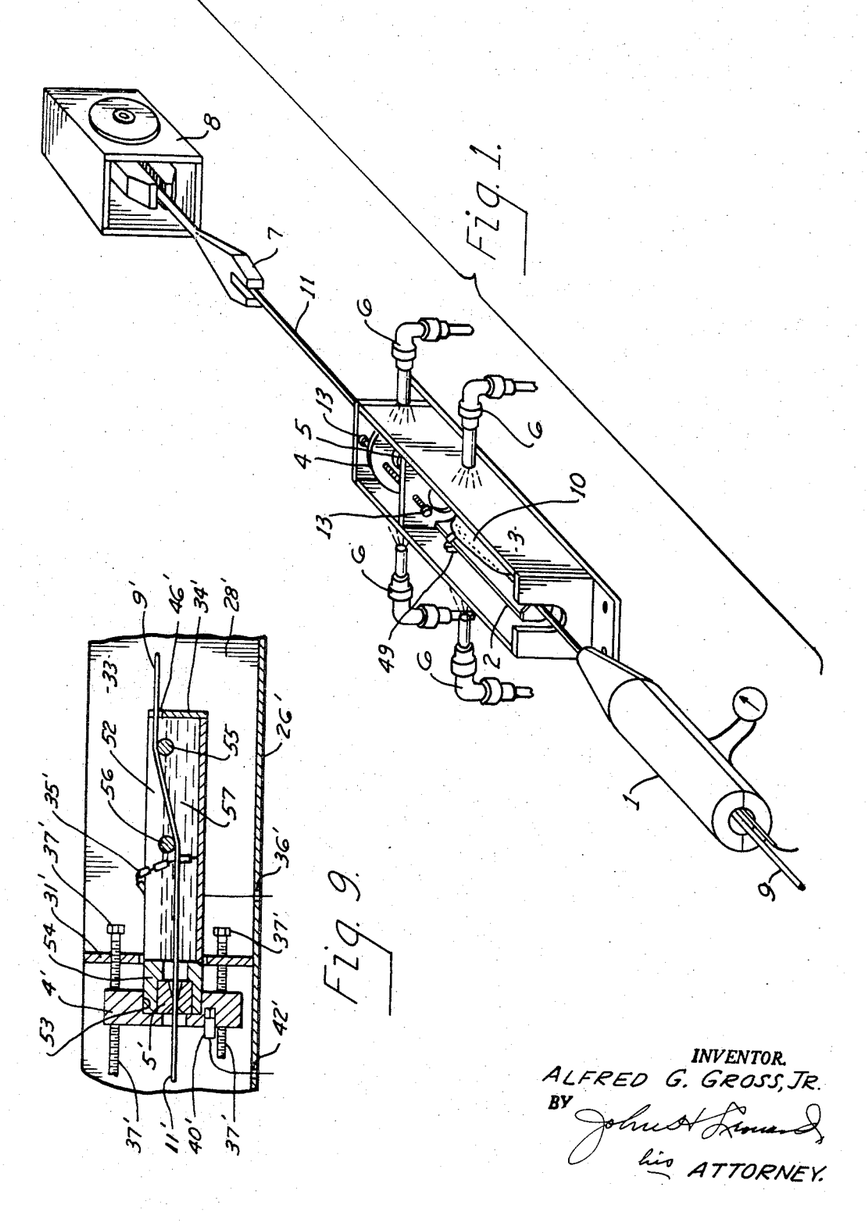
FIGURE 1 is a partial perspective diagram of the wire-drawing apparatus for practising the present invention, the cover and insulation of the die box being omitted for clearness in illustration.
FIGURE 9 is a fragmentary cross sectional view, similar to FIGURE 3, showing a modified lubricant box arranged for a liquid lubricant.

Referring to FIGURE 1, the wire drawing equipment comprises a furnace 1, lubricant box 2, die box 3, containing a die holder 4, a die 5, and gas burners 6, followed by wire grips 7, and a draw carriage 8 of the conventional drawbench type, arranged in a row, in the order recited, along the path of travel of the wire to be drawn.

Draw stock 9 is preferably in the form of rods of vacuum hot-pressed beryllium, warm extruded. Beryllium rods, extruded hot or machined, from vacuum hot-pressed beryllium are very desirable in many cases, depending on the characteristics required in the drawn product. Starting stock fabricated by other methods may be used in some instances.

The stock is first cleaned, as is the normal practice, such as by immersing it in a molten bath at about 900° F., of sodium hydride or of a descaling salt, for example, such as Virgo, principally composed of sodium hydroxide and nitrate salts. After cleaning, the stock is air cooled to room temperature and then water rinsed. A pickling operation in an aqueous solution of diluted hydrofluoric and nitric acids, usually 2% and 20%, by volume, respectively, may be used, if desired.

The cleaned stock is then pointed for entry into the die 5 by either a hot rolling method, using standard roll pointing equipment, or a chemical etching technique. Should chemical etching be preferred to hot rolling, a relatively concentrated solution of hydrofluoric acid should be used.

After the stock 9 has been cleaned and pointed, it is precoated by brushing, dipping or spraying on its surface a lubricant, such as molybdenum disulfide ($MoS_2$) in an epoxy resin binder, for example, a preparation currently sold in the market as Acheson Colloid DAG 223, and manufactured by Acheson Colloids Company, and is allowed to air dry and is then cured for one hour at 400° F. It can be appreciated that other lubricants may be employed which would satisfy the drawing requirements commonly associated with the wire-drawing art, and the invention is not to be limited to a resin bonded solid film lubricant. Any lubricant which will operate within the working temperature range is potentially applicable if such lubricant will satisfy the below requirments: It is (1) chemically stable for a reasonable length of time in the presence of beryllium at the temperature to be used for drawing, and (2) the lubricant, solid or liquid, retains lubricating powers at the drawing temperature and lubricates the metal beryllium.

An example of an oil, liquid, lubricating vehicle is one currently sold on the market as Gulf Crest No. 196, and manufactured by Gulf Oil Corporation. The lubricity of this oil at a drawing temperature of 600° F. for the cyclic reductions was found to satisfy both of the above requirements. Further, where such a liquid lubricant is used, the primary and secondary lubricants, as disclosed herein, may be dispensed with and said oil lubricant placed in a liquid lubricant box, as disclosed hereinafter.

Briefly, the precoated draw stock 9 is then pre-heated by passing it through the furnace 1, thence through a secondary lubricant 10, such as powdered flake graphite, in the box 2, to the die 5 which preferably is a standard tugnsten-carbide die. During drawing of the stock 9 through the die, the stock is reduced in cross-sectional area to a resultant beryllium wire 11 by the drawing cone in the die.

In order to advance the stock 9 through the die 5, the pointed portion of the stock is gripped by the clamp 7. The clamp is likewise gripped by vise means in the carriage 8. The conventional drawbench endless chain (not shown) in turn moves the carriage away from the stationary die 5 in the well-known manner so as to exert the necessary pulling force upon the wire 11 for drawing it.

Figure 6:
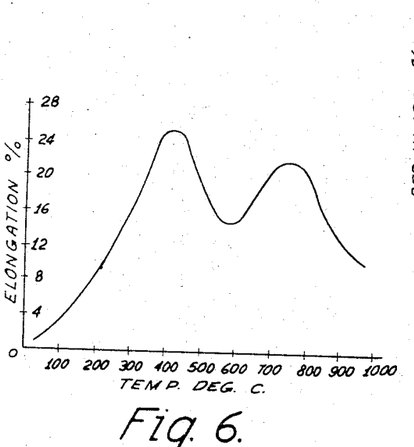
FIGURES 6 and 7 are graphs showing the effect of temperature on the mechanical properties of the metal beryllium.
Figure 7:
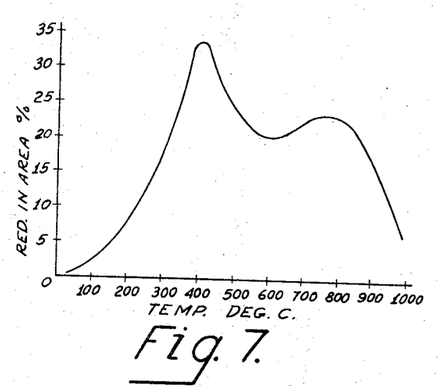

The furnace 1 is open at its ends and may be either a gas or electric unit, providing it distributes the heat properly. A muffle type of furnace is preferred. Generally an evenly distributed temperature throughout the heating area is desired, thereby avoiding the hot spot condition which is generally caused by many heating units, particularly unmuffled ones. A thermocouple is arranged with its bead located midway between the furnace openings in order to provide for positive temperature control. The temperature of the furnace is preferably maintained constant at 800° F. throughout the drawing operation, this temperature being within the temperaure range of about 600° F. to about 950° F., in which it is preferred to practice the invention. It will be noted that the highest percent of elongation and highest percent of reduction in area coexist in metal beryllium, at 750° F. to 800° F., as shown in FIGURES 6 and 7.

Suitable means are provided to supply the proper heat to the lubricant, die, and wire at different locations along the path of travel of the wire. In the illustrative example, a uniform heat is employed. For this purpose, the die box 3 is in the form of dual controlled-temperature chamber means including a lubricating chamber and a die chamber, and is enclosed within an insulating container 12 having a removable cover 13, as shown in FIGURES 2–5. The removable cover is fabricated in such manner that only its top 14, rear wall 15, and forward wall 16 are covered with insulation material 17, which may be micro-quartz glass, and strengthening means 18, such as transite. The exterior of the removable cover 13 is covered with aluminum sheet 19 which also forms side plates 20. Fastening means such as cap screws 21 may be used to assemble the cover 13. A handle 22 is provided for ease of handling.

The top 14 of the cover 13, when positioned over the die box 3, rests upon side walls 23 of the container 12, said walls being composed of the same insulation material, strengthening means, and aluminum sheet as the cover. The side walls 23 are affixed to a container base 24 by cap screws 25, said base being constructed similarly as the side walls.

The die box 3 has a rectangular base plate 26 which is securely fastened to the container base 24 by bolts 27. The sides of the die box are composed of two muffle plates 28, which are of shorter length than the base plate 26 and of a width slightly less than the distance between the top of the side walls 23 and the top of the container base 24. The muffle plates may be secured to the base plate in any conventional manner, such as by spot welding. To the muffle plates 28 are affixed, as by welding, an end plate 29 and a forward die holder plate 30. Spaced rearwardly from the forward die holder plate 30 and affixed to the muffle plates 28, as by welding, is a rear die holder plate 31 which divides the die box 3 into two chambers, a die holder chamber 32 and a lubrication chamber 33.

The lubricant box 2 is supported within the lubrication chamber 33 by a suitable support, which may be the rear die holder plate 31, in spaced relationship to the base plate 26 and muffle plates 28 and thus in spaced relation to the side walls of the lubrication chamber. The lubricant box 2 is in the form of a U-shaped plate, to one end of which a U-shaped end plate 34 is affixed. Consequently, in combination with the rear die holder plate 31, a container is formed for the secondary lubricant 10, which may be lubricating grade powdered flake graphite. The secondary lubricant 10, which completes the lubricant system, insures proper wire lubrication for drawing operations. It should be noted that though such a secondary lubricant is not a necessity, by following such a procedure, the precautions taken to protect the primary rod coating from damage prior to drawing may be relaxed and yet not hinder the drawing operation. Further, such a procedure substantially eliminates the galling problem commonly associated with conventional wire drawing. Embedded within the lubricant 10 is a thermocouple 35 which maintains positive temperature control within the lubrication chamber. A thermocouple passage 36 is provided in the base 24 and base plate 26 for the insertion of the thermocouple 35. By maintaining the surface temperature of the drawing stock constant immediately prior to entry into the die, maximum drawability is assured. This temperature is assured since the muffle plates 28 distribute the heat throughout the lubrication chamber. Preferably the stock temperature at the die will thus be maintained constant throughout the drawing operation at 750° F., said temperature being within the temperature range previously mentioned of from about 600° F. to about 950° F.

The circular die holder plate 4 is located within the die holder chamber 32 in spaced relationship to the walls thereof, by opposing sets of jackscrews 37. The jackscrews 37 not only position the die holder 4, but also the die 5, which is inserted within a center die-retaining counterbore 38 in the die holder, in a transverse plane perpendicular to the drawing force. The jackscrews further position the die 5 so that the centerline of the die coincides with the centerline of the path of the wire. A bore 39 is provided in the die holder 4 to accommodate a thermocouple 40, the bead of which is in contact with the die holder body. The bore 39 should preferably be as near as possible to the die-retaining counterbore 38 so that the thermocouple senses, in part, the highest temperature gradient emitted from drawing cone 41 of the die 5. A bore 42 is provided in the base 24 and base plate 26 for accommodating the thermocouple lead. The function of the thermocouple 40 is to sense the resultant temperature developed within the die holder nearest the drawing cone 41. This resultant temperature is a combination of the frictional heat due to working of the metal and the radiant heat within the die holder chamber which is supplied by gas burners 6. This reading generally reflects the actual temperature of the wire at the point of reduction. Preferably the temperature of the wire is maintained throughout the drawing operation at 750° F., this being within the specified temperature range.

Figure 2:
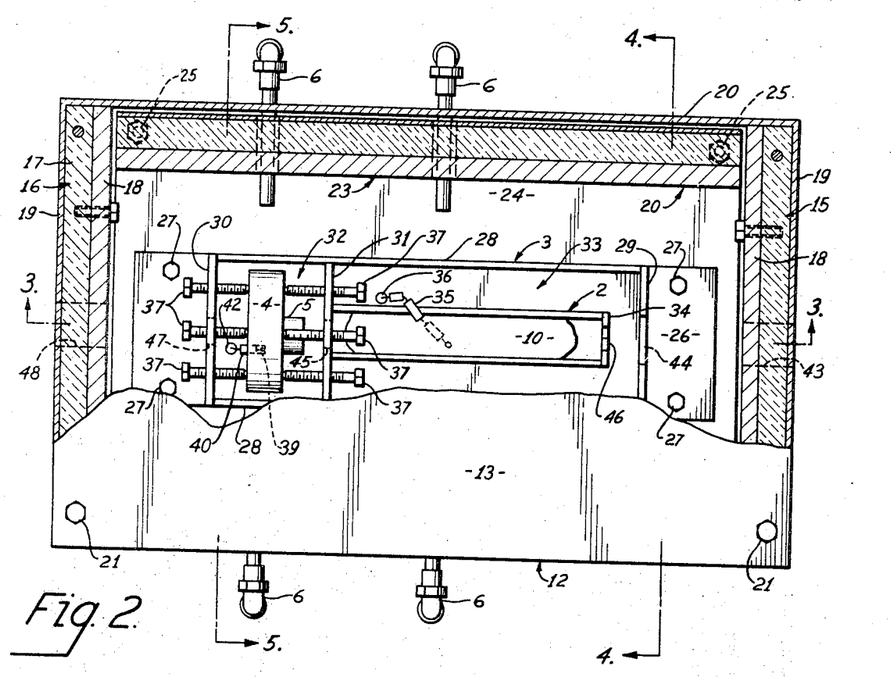
FIGURE 2 is a top view of the die box, with the cover and insulation installed, part thereof being shown in horizontal section for clearness in illustration, and is taken along line 2—2 in FIGURE 3.
Figure 3:
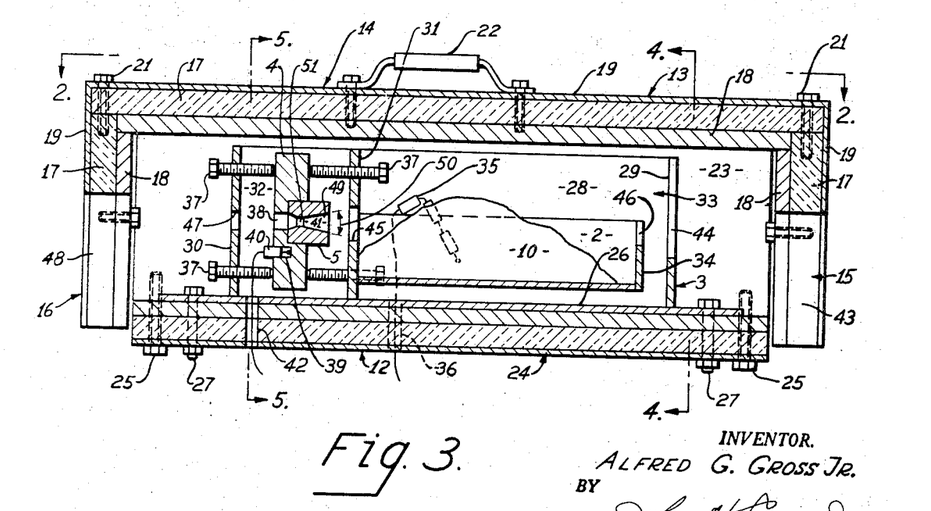
FIGURE 3 is a vertical longitudinal sectional view of the die box, and is taken on line 3—3 in FIGURE 2.
Figure 4:
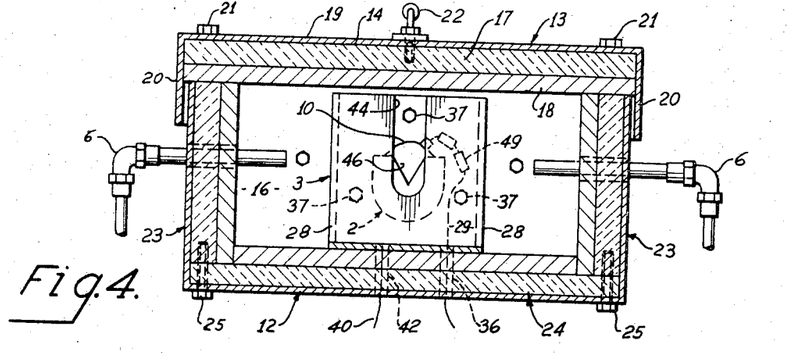
FIGURE 4 is a vertical cross sectional view, taken along line 4—4 in FIGURES 2 and 3.

A series of adjustable flame gas burners 6 supplies the radiant temperature requirements needed for successful drawability, although electric ring heaters or other heating means may be used.

To permit the wire drawing stock to travel through the removable cover 13, die box container 12, and die box 3, while reducing heat losses, a series of openings are provided. These include an inverted U-opening 43 in the rear wall 15 of the cover 13 for permitting the preheated stock 9 issuing from the furnace 1 to pass into the die box container 12. Entrance to the lubrication and die holder chambers is provided by a U-opening 44 in the end plate 29 and a circular ingress opening 45 in the rear die holder plate 31. A V-slot 46 is cut into the end plate 34. An egress opening 47 and an inverted U-opening 48 are provided in the forward die holder plate 30 and forward wall 16, respectively.

Figure 5:
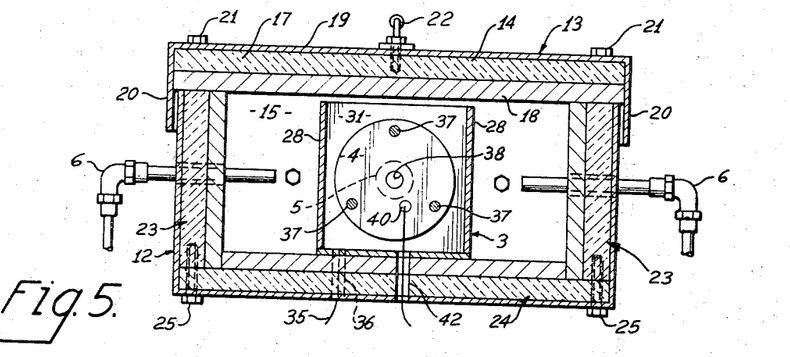
FIGURE 5 is a vertical sectional view of the die box showing the die holder, and is taken along line 5—5 in FIGURES 2 and 3.

The die 5 is of the standard tungsten-carbide type wherein an entrance bell 49 gives a free access while guiding the lubricant 11 and stock 9 smoothly into the drawing cone 41. The drawing cone 41 is the working area of the die for reducing the stock diameter. The drawing cone preferably has a die angle 50 of 12½°, although other full-entry angles may be used. The die has a parallel, or gauging cylinder, 51 which is rearwardly of the drawing cone and which establishes the drawn wire size, and further facilitates cleaning of the die without altering the drawn wire size. The length of the parallel must be taken into consideration, since additional frictional heat is developed as the length increases. This factor could decrease the drawing efficiency if the heat developed became excessive.

As mentioned previously, the die box 3 is divided into two chambers by the rear die holder plate 31. Referring to FIGURE 9, an alternate method of lubricating the beryllium stock 9 is illustrated, and employs a liquid lubricant box 52, instead of the lubricant box 2, within the lubrication chamber 33. In this alternate construction, the features which are the same as those heretofore described are indicated by the same numerals primed. The die holder 4' is provided with a counterbore 53 which retains a die retaining member 54. The outer surface of member 54 is in slidable engagement with the die counterbore 53. Two concentric cylindrical surfaces within the member 54 form a counterbore which serves as the die retaining means. The smaller diameters of the two counterbores restrain a die 5' from moving longitudinally. To the die retaining member 54 is affixed securely, as by welding, the liquid lubricant box 52. The lubricant box 52 is, as lubricant box 2, in space relationship to the base 26', and muffle plates 28'. End plate 34' is, as in lubricant box 2, provided with a V-slot 46'. Spaced within the lubricant box 52 are two securely positioned guiding rods 55 and 56. Rod 55 is spaced slightly above and rearwardly of the bottom portion of slot 46' in end plate 34'. Rod 56 is spaced approximately midway between the ends of lubricant box 52 and approximately midway between the top and base of said lubricant box. After the stock 9' is pointed, as mentioned previously, and inserted through the die 5', the liquid lubricant 57, such as Gulf Crest No. 196, is poured into the lubricant box 52 to a sufficient depth so as to cover rod 56. Heat is then applied to the muffle plates and when the bead of the thermocouple 35', which is immersed in the liquid lubricant, senses a temperature of 600° F. under atmospheric pressure, the drawing operation is commenced. Prior to any process annealing, the oil is removed, as is the solid lubricant, in any commercial solvent, such as trichloroethylene. By omitting the rods 55 and 56 and by further increasing the depth of the V-slot 46', the liquid lubricant box 52 may readily be converted to a solid lubricant box similar to lubricant box 2, hereinbefore described.

It may readily be appreciated that by introducing the furnace, die box, and insulating means in a capstan-block or multiple draft machine, whether of the cumulative or non-cumulative type, continuous lengths of beryllium wire may readily be produced. A payoff reel, and capstan, if used, should be enclosed within suitable insulating means, such as disclosed hereinbefore. The chambers thus formed should then be heated by strip electric heaters or other means to 250–450° C. so that the beryllium stock is in a condition which is more ductile than at room temperature, thereby allowing for ease of bending as it is removed from the payoff reel and passed through the machine.

As has been previously stated, the starting material may be vacuum block hot-pressed beryllium, or extruded beryllium rods. Prior to any drawing operation, the material preferably is stress relieved. Further, the material must be cleaned and pointed, as noted previously, after which the primary lubricant is applied. Assuming the stock is to be drawn at a few degrees above 750° F., the stock is heated in the furnace to 800° F. to offset partial heat loss prior to entry into the lubrication chamber. The wire enters the lubrication chamber at about 750° F., depending upon ambient temperature. It loses heat passing from the lubrication chamber to the die chamber. Hence the die and lubrication chambers are heated to 750° F. Because the die drawing cone temperature will increase as the drawing operation proceeds, due to the frictional resistance, the die chamber temperature is adjusted so as to be maintained at 750° F., so that the temperature of the wire is somewhat above 750° F. when drawn. This completes the preparation of the starting material for the first reduction by wire drawing. By adjusting these temperatures, preselected temperatures at the drawing throat are obtained.

If the starting diameters are to be within the 0.750–0.500 inch range, special care must be exercised to avoid a cumulative build-up of adverse residual stresses which are concentrated near the surface of the stock. If such care is not exercised, fracture will occur during drawing. In this range of diameters, a thermal treatment after each pass, wherein up to approximately 35% reduction in area is accomplished, leading to at least a mild amount of grain growth, is required to avoid the fracturing during subsequent drawing operations. This thermal treatment is generally accomplished by maintaining the stock at 1300° F. to 1500° F. for 30 to 60 minutes at temperature; cooling rate being unimportant so long as thermal cracking is not induced by too fast a cooling rate. When a diameter of approximately 0.480 inch or smaller has been obtained either by wire drawing from a larger diameter or by utilizing a starting material at this size, the above thermal treatment per pass may be omitted. It should be noted, however, that if only approximately 35% cumulative reduction is needed for the final wire size, further drawing being unnecessary, the essential stress-relieving step may be eliminated.

Tables I and II following provide an example of the sequence of operations for drawing diameters between 0.480 inch and 0.005 inch to rod, wire, or fine wire, that is, rod, wire or fine wire which possesses maximum ductility at room temperature without possessing particularly high strength. By beryllium fine wire is meant wire sizes below 0.030 inch in diameter.

EXAMPLE 1

TABLE I.—DIE SCHEDULE FOR EQUAL DRAFTING

[20% reduction in area per pass (nominal)]

| Pass No. | Die Size (inch) | Nominal Reduction in Area per Pass (percent) | Pass No. | Die Size (inch) | Nominal Reduction in Area per Pass (percent) |
|---|---|---|---|---|---|
| Start Material | 0.480 | | 21 | 0.0451 | 20 |
| 1 | 0.430 | 20 | 22 | 0.0403 | 20 |
| 2 | 0.375 | 20 | 23 | 0.0361 | 20 |
| 3 | 0.339 | 18 | 24 | 0.0323 | 20 |
| 4 | 0.303 | 20 | 25 | 0.0288 | 20 |
| 5 | 0.271 | 20 | 26 | 0.0258 | 20 |
| 6 | 0.249 | 16 | 27 | 0.0231 | 20 |
| 7 | 0.216 | 25 | 28 | 0.02064 | 20 |
| 8 | 0.193 | 20 | 29 | 0.0185 | 20 |
| 9 | 0.173 | 20 | 30 | 0.0165 | 20 |
| 10 | 0.154 | 20 | 31 | 0.0148 | 20 |
| 11 | 0.138 | 20 | 32 | 0.0132 | 20 |
| 12 | 0.125 | 18 | 33 | 0.0118 | 20 |
| 13 | 0.110 | 22 | 34 | 0.0106 | 20 |
| 14 | 0.0985 | 20 | 35 | 0.00945 | 20 |
| 15 | 0.0881 | 20 | 36 | 0.00846 | 20 |
| 16 | 0.0788 | 20 | 37 | 0.00756 | 20 |
| 17 | 0.0705 | 20 | 38 | 0.00676 | 20 |
| 18 | 0.0630 | 20 | 39 | 0.00605 | 20 |
| 19 | 0.0564 | 20 | 40 | 0.00541 | 20 |
| 20 | 0.0504 | 20 | 41 | 0.00484 | 20 |
| | | | 42 | 0.00433 | 20 |

The above die schedule (Table I) is used in conjunction with the following schedule (Table II) of interjected thermal treatments.

TABLE II.—SCHEDULES FOR INTERJECTING THERMAL TREATMENTS INTO DIE SCHEDULE, TABLE I

[Interject thermal treatments after pass nos.]

| | Schedule | | | | | |
|---|---|---|---|---|---|---|
| | A | B | C | D | E | F |
| 1 | | | | | | |
| 2 | 2 | | | | | |
| 3 | | | 3 | | | |
| 4 | 4 | | | 4 | | |
| 5 | | | | | 5 | |
| 6 | 6 | | 6 | | | 6 |
| 7 | | | | | | |
| 8 | 8 | | | 8 | | |
| 9 | | | 9 | | | |
| 10 | 10 | | | | 10 | |
| 11 | | | | | | |
| 12 | 12 | | 12 | 12 | | 12 |
| 13 | | | | | | |
| 14 | 14 | | | | | |
| 15 | | | 15 | | 15 | |
| 16 | 16 | | | 16 | | |
| 17 | | | | | | |
| 18 | 18 | | 18 | | | 18 |
| 19 | | | | | | |
| 20 | 20 | | | 20 | 20 | |
| 21 | | | 21 | | | |
| 22 | | | | | | |
| 23 | | | | | | |
| 24 | 24 | | 24 | 24 | | 24 |
| 25 | | | | | 25 | |
| 26 | 26 | | | | | |
| 27 | | | 27 | | | |
| 28 | 28 | | | 28 | | |
| 29 | | | | | | |
| 30 | 30 | | 30 | | 30 | 30 |
| 31 | | | | | | |
| 32 | 32 | | | 32 | | |
| 33 | | | 33 | | | |
| 34 | 34 | | | | | |
| 35 | | | | | 35 | |
| 36 | 36 | | 36 | 36 | | 36 |
| 37 | | | | | | |
| 38 | 38 | | | | | |
| 39 | | | 39 | | | |
| 40 | 40 | | | 40 | 40 | |
| 41 | | | | | | |
| 42 | 42 | | 42 | 42 | 42 | 42 |
| Cumulative Reduction per Cycle | | | | | | |
| 20% | 36% | 49% | 59% | 74% | | |

Concerning the process annealing or thermal treatment several treatments at temperatures between 1300° F. and 1500° F. may be used, with the amount of time at the selected temperature decreasing proportionally from 60 minutes for 1300° F. to 6 minutes for 1500° F. A temperature of 1430° F. for 30 minutes for the stress relieving and recrystallization operations may be used. The cooling rate is not critical, and any procedure from water quenching to furnace cooling is acceptable, providing thermal cracking heretofore mentioned is not induced. If desired, higher temperatures may be used.

It is advisable to clean the stock and remove the lubricant, prior to the thermal treatment, since the lubricant may react with the surface of the stock during the thermal treatment. Further, the stock must be pointed and the primary lubricant applied after the thermal treatment, but prior to the next drawing operation.

The above Example 1 is not intended to limit the invention to a maximum reduction in area per pass of 20 percent. It is possible to successfully accomplish as much as a 35 percent reduction in area in a single pass; in fact, even larger reductions are possible with a more efficient lubrication system. The influence of the lubrication system efficiency on the maximum reduction in area for a given pass, after the first thermal treatment, is shown by the following expression:

$$D = 1 - \frac{1}{e^{b(n+1)}} \times 100\%$$

wherein D is the reduction in area possible on a given pass, e is the natural log base, b, is the drawing efficiency, depending on the lubricant, and n is the strain hardening exponent of the metal beryllium at the drawing temperature.

A 20 to 25 percent reduction in area per pass is economically optimum for the following reasons:

(1) The more popular commercially-desirable stock diameters, such as, 0.125, 0.062, and 0.032-inch, etc., are produced as a matter of course by following such a drafting schedule.

(2) By combining this drafting schedule with Schedule C of Table II, these commercially desirable stock diameters are produced in a thermally treated condition; the condition most desirable commercially.

(3) By adhering to this drafting practice, maximum utilization is obtained of a single primary lubricant application, only one application being required between thermal treatments, with a minimum thermal treatment cost.

(4) By following this drafting practice, the primary lubricant is still acceptably efficient during the final pass prior to thermal treatment in that it will prevent galling for the three passes of 20% reduction in area each, as indicated by Schedule C of Table II.

The drawing force required for the above procedures ranges from approximately one pound at very small diameters such as 0.005 of an inch to approximately forty-five thousand (45,000) pounds at diameters of 0.750 of an inch.

The drawing speed is not dictated by the deformation rate, which is generated in the drawing cone of the die, but rather by the velocity of the surface of the stock relative to the parallel of the die. Thus, in order to avoid the destruction of the lubrication system by local overheating in the die parallel, such as would be due to a high rate of frictional heat generation, the drawing speed must be kept at a relatively low level. Further, a high rate of frictional heat generation could through-heat the stock in the die and thus shift the effective working temperature out of the maximum ductility range evidenced by FIGURES 6 and 7, the range in which it is preferable to practice the invention. This shift would decrease the value of the strain-hardening exponent, $n$, in the above-mentioned expression, thus decreasing the drawability. The strain hardening exponent has the same temperature dependent tends as elongation.

Although a draw speed of 50 feet per minute is not excessive, a speed of 10 feet per minute was used in the above Example 1.

Table III, below, shows the mechanical properties developed for the above Example 1, using the basic method herein disclosed.

TABLE III.—ROOM TEMPERATURE TENSILE PROPERTIES OF BERYLLIUM WIRE AND FINE WIRE

| Nominal Diameter (inch) | Work State | Tensile Strength (K s.i.) | Uniform Contraction (percent) | Elongation in 2 inches (percent) |
|---|---|---|---|---|
| 0.099 | As Drawn | 127.5 | 0.8 | |
|  | H.T. | 71.1 | 1.7 | |
| 0.093 | As Drawn | 110.3 | 2.8 | |
|  | H.T. | 59.3 | 4.6 | |
| 0.063 | As Drawn | 127.1 | 0.9 | 0.9 |
|  | H.T. | 79.4 | 2.8 | 2.9 |
| 0.020 | As Drawn | 125.2 | | 0.3 |
|  | H.T. | 103.3 | 4.7 | 6.6 |
| 0.015 | As Drawn | | | |
|  | H.T. | 98.2 | 4.3 | 5.7 |
| 0.010 | As Drawn | | | |
|  | H.T. | 89.0 | 3.7 | 3.9 |
| 0.005 | As Drawn | 111.2 | 0.0 | 0.2 |
|  | H.T. | 76.2 | | 3.4 |

By modifying the method hereinbefore disclosed, as by eliminating the thermal treatment, reducing the reduction in area per pass, and reducing the drawing speed and thereafter drawing the wire continuously at the reduced reduction in area per pass and speed, the mechanical properties at room temperature of the wire may be varied. Thus, the high strength beryllium wire, and wire in the fine wire range, can be produced. For example, starting with heated stock of relatively large diameter and drawing it to a diameter of 0.480 inch more or less, as hereinbefore disclosed, thermal treating the stock, continuing to draw at the same reduction in area per pass for a predetermined number of passes (that is, the cumulative reduction in area from the last thermal treatment must not exceed approximately 70%), and then reducing the reduction in area per pass and the drawing speed, and drawing continuously thereafter without thermal treatment, the high strength beryllium wire and the fine wire can be effectively produced. Like results can be obtained starting with stock or wire of about 0.480 inch or less in diameter, initially heating it to the required drawing temperature and then proceeding as above.

Thus, starting with stock of 0.750 inch, the reductions might be about 30% per pass, with thermal treatments, until the stock is about 0.480 inch in diameter, whereupon the stock is then drawn continuously at the same reduction in area per pass and without thermal treatment, and at a reduced reduction in area per pass of about 10%, after a predetermined number of passes, as mentioned previously, and at reduced drawing speed. It should be noted, however, that the invention may be practiced without resort to the predetermined number of passes, that is, after the last thermal treatment, the reduced reduction in area per pass of approximately 10% may immediately be used. By utilizing the predetermined member of passes concept, the high strength wire can more economically be produced.

In practising the invention, the high strength berrylium wire and fine wire can be successfully manufactured at draw speeds of approximately 20 feet per minute or less, at the reduced reduction in area per pass. Should this upper limit be exceeded, say to 30 feet per minute, for 6 to 9 passes or more, dependent upon the degree of work, fracture occurs, thereby preventing further drawing. The reduced reduction in area per pass mentioned should be approximately on the order of 1.11:1 reduction ratio, or 10% reduction in area, although a 12% reduction in area is not excessive. Thus, a reduction in area of 18% or more is considered excessive and should therefore not be employed.

The following examples indicate the steps that may be used for making berryllium wire and fine wire of high strength, starting with different stock diameters:

EXAMPLE 2

TABLE IV.—DIE SCHEDULE FOR HIGH STRENGTH BERYLLIUM WIRE
[0.252–0.069-inch diameter]

| Pass No. | Die Size (inch) | Reduction in Area per Pass (percent) |
|---|---|---|
| Start Material | 0.252 | |
| 1 | 0.218 | 25 |
| 2 | 0.189 | 25 |
| 3 | 0.164 | 25 |
| 4 | 0.142 | 25 |
| 5 | 0.127 | 20 |
| 6 | 0.120 | 10 |
| 7 | 0.114 | 10 |
| 8 | 0.108 | 10 |
| 9 | 0.102 | 10 |
| 10 | 0.0966 | 10 |
| 11 | 0.0915 | 10 |
| 12 | 0.0867 | 10 |
| 13 | 0.0821 | 10 |
| 14 | 0.0778 | 10 |
| 15 | 0.0737 | 10 |
| 16 | 0.0698 | 10 |

TABLE V.—ROOM TEMPERATURE TENSILE PROPERTIES OF BERYLLIUM WIRE PROCESSED PER TABLE IV

| Nominal Diameter (inch) | Work State | Tensile Strength (K s.i.) | Uniform Contraction (percent) |
|---|---|---|---|
| 0.252 | Block Pressed and Annealed. | 42.6 | 1.4 |
| 0.165 | As drawn | 94.5 | 1.0 |
| 0.142 | do | 104.9 | 1.2 |
| 0.120 | do | 115.2 | 1.3 |
| 0.115 | do | 120.6 | 2.3 |
| 0.107 | do | 127.9 | 1.5 |
| 0.100 | do | 127.6 | 2.0 |
| 0.092 | do | 132.4 | 1.7 |
| 0.086 | do | 139.2 | 1.2 |
| 0.078 | do | 147.1 | 1.9 |
| 0.073 | do | 149.0 | 3.6 |
| 0.069 | do | 158.1 | 0.7 |

EXAMPLE 3

TABLE VI.—DIE SCHEDULE FOR HIGH STRENGTH BERYLLIUM WIRE AND FINE WIRE

[0.063–0.005-inch diameter]

| Pass No. | Die Size (inch) | Reduction in Area per Pass (percent) | Pass No. | Die Size (inch) | Reduction in Area per Pass (percent) |
|---|---|---|---|---|---|
| Start Material | 0.063 | --- | 21 | 0.0137 | 10 |
| 1 | 0.0538 | 27 | 22 | 0.0130 | 10 |
| 2 | 0.0459 | 27 | 23 | 0.0123 | 10 |
| 3 | 0.0392 | 27 | 24 | 0.0117 | 10 |
| 4 | 0.0335 | 27 | 25 | 0.0111 | 10 |
| 5 | 0.0318 | 10 | 26 | 0.0105 | 10 |
| 6 | 0.0301 | 10 | 27 | 0.00997 | 10 |
| 7 | 0.0286 | 10 | 28 | 0.00946 | 10 |
| 8 | 0.0271 | 10 | 29 | 0.00897 | 10 |
| 9 | 0.0257 | 10 | 30 | 0.00851 | 10 |
| 10 | 0.0244 | 10 | 31 | 0.00807 | 10 |
| 11 | 0.0231 | 10 | 32 | 0.00766 | 10 |
| 12 | 0.0220 | 10 | 33 | 0.00727 | 10 |
| 13 | 0.0208 | 10 | 34 | 0.00689 | 10 |
| 14 | 0.0198 | 10 | 35 | 0.00654 | 10 |
| 15 | 0.0188 | 10 | 36 | 0.00620 | 10 |
| 16 | 0.0178 | 10 | 37 | 0.00588 | 10 |
| 17 | 0.0169 | 10 | 38 | 0.00558 | 10 |
| 18 | 0.0160 | 10 | 39 | 0.00530 | 10 |
| 19 | 0.0152 | 10 | 40 | 0.00502 | 10 |
| 20 | 0.0144 | 10 | | | |

TABLE VII.—ROOM TEMPERATURE TENSILE PROPERTIES OF BERYLLIUM FINE WIRE PROCESSED PER TABLE VI

| Nominal Diameter (inch) | Work State | Tensile Strength (K s.i.) | Elongation in 4 inches (percent) |
|---|---|---|---|
| 0.063 | Annealed | 79.4 | 2.9 |
| 0.030 | As Drawn | 140.0 | 0.6 |
| 0.025 | do | 147.3 | 0.6 |
| 0.020 | do | 156.3 | 0.9 |
| 0.015 | do | 177.3 | 1.1 |
| 0.010 | do | 178.4 | 1.1 |
| 0.005 | do | 187.4 | 1.0 |

EXAMPLE 4

TABLE VIII.—DIE SCHEDULE FOR HIGH STRENGTH BERYLLIUM WIRE AND FINE WIRE

[0.030–0.005-inch diameter]

| Pass No. | Die Size (inch) | Reduction in Area per Pass (percent) | Pass No. | Die Size (inch) | Reduction in Area per Pass (percent) |
|---|---|---|---|---|---|
| Start Material | 0.0301 | --- | 16 | 0.00946 | 10 |
| 1 | 0.0257 | 27 | 17 | 0.00897 | 10 |
| 2 | 0.0231 | 19 | 18 | 0.00851 | 10 |
| 3 | 0.0208 | 19 | 19 | 0.00807 | 10 |
| 4 | 0.0188 | 19 | 20 | 0.00766 | 10 |
| 5 | 0.0169 | 19 | 21 | 0.00727 | 10 |
| 6 | 0.0160 | 10 | 22 | 0.00689 | 10 |
| 7 | 0.0152 | 10 | 23 | 0.00654 | 10 |
| 8 | 0.0144 | 10 | 24 | 0.00620 | 10 |
| 9 | 0.0137 | 10 | 25 | 0.00588 | 10 |
| 10 | 0.0130 | 10 | 26 | 0.00558 | 10 |
| 11 | 0.0123 | 10 | 27 | 0.00530 | 10 |
| 12 | 0.0117 | 10 | 28 | 0.00502 | 10 |
| 13 | 0.0111 | 10 | | | |
| 14 | 0.0105 | 10 | | | |
| 15 | 0.00997 | 10 | | | |

TABLE IX.—ROOM TEMPERATURE TENSILE PROPERTIES OF BERYLLIUM FINE WIRE PROCESSED PER TABLE VIII

| Nominal Diameter (inch) | Work State | Tensile Strength (K s.i.) | Elongation in 4 inches (percent) |
|---|---|---|---|
| 0.0301 | Annealed | [1] 80 | [1] 3.0 |
| 0.025 | As Drawn | 130.2 | 0.4 |
| 0.020 | do | 125.1 | 0.3 |
| 0.015 | do | 140.1 | 0.3 |
| 0.010 | do | 158.1 | 1.6 |
| 0.005 | do | 182.8 | 0.9 |

[1] Approx.

Figure 8:
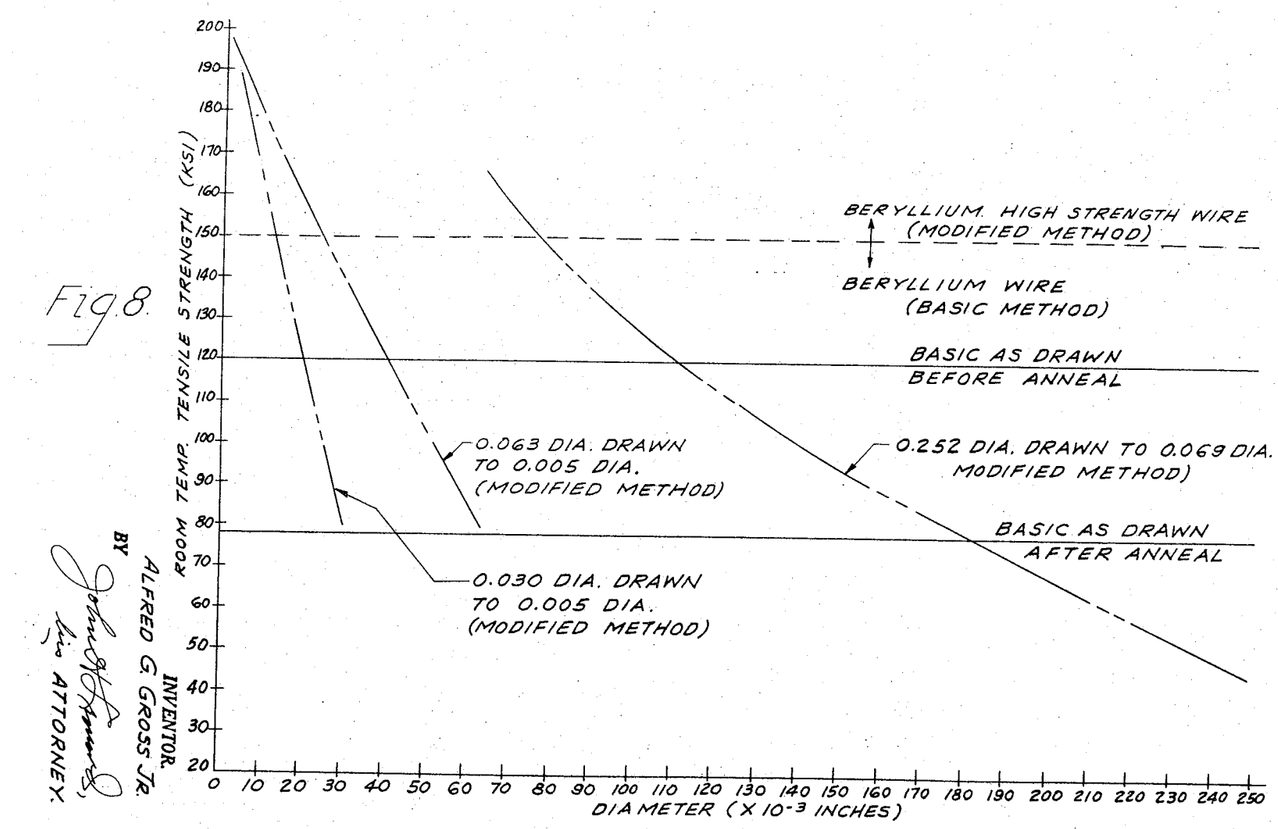
FIGURE 8 is a graph showing the trend of the mechanical properties of the metal beryllium as drawn in accordance with the present invention, using different modifications in the steps of the invention to obtain the respective properties therein shown.

Reference is next made to FIGURE 8, which shows the different tensile properties developed for the different work states of beryllium wire, including beryllium wire in the fine wire range. It may readily be seen from FIGURE 8 that differences in finished diameter do not affect the tensile properties of the wire and fine wire produced by the basic method, and further, such wire so produced is below the high strength wire range. However, FIGURE 8 shows that irrespective of finished diameter, by omission of the thermal treatment in conjunction with the other modifications, as set forth in the modified method, high strength wire having high tensile strengths in excess of 150,000 p.s.i. is obtained. The absolute magnitude of these strengths is a function of the degree of work induced. By referring to the Percent Elongation and/or Uniform Contraction values in Tables III, V, VII and IX, it may readily be seen that beryllium wire made in accordance with the basic method hereinbefore disclosed has relatively high ductility after melting, as compared to high strength beryllium wire. By producing high strength beryllium wire by the modified method, as hereinbefore disclosed, these relatively high ductility values were not generated.

Reference is now made to Table I below wherein is given an indication of the acceptable combinations of drafting practice and drawing speeds a wire drawer may successfully use. By way of an illustrative example, a wire drawer may desire, for economical reasons, to utilize a schedule such as $C+J+H$ that is, draw approximately 4 passes at approximately 25% reduction in area per pass at a drafting speed greater than 20 f.p.m., followed by approximately 7 passes at approximately 10% reduction in area per pass at the same drafting (but dependent upon the degree of work as hereinbefore mentioned) without intermediate thermal treatment, and then followed by as many passes as necessary at approximately 10% reduction in area per pass and at a drafting speed of approximately 10 f.p.m., without intermediate thermal treatment, to obtain high strength beryllium wire in the wire size hereinbefore disclosed.

TABLE X.—DRAFTING COMBINATIONS FOR HIGH STRENGTH BERYLLIUM WIRE DRAW SPEED AND REDUCTION IN AREA PER PASS
[For wire diameters less than 0.500 inch]

| Reduction in Area/Pass | Speed | | |
|---|---|---|---|
| | Low<br>Approx. 10 or less (f.p.m.) | Medium<br>Approx. 10 to approx. 20 (f.p.m.) | High<br>Approx. 20 or more (f.p.m.) |
| High—approx. 25% or more. | A—approx. 4 passes. | B—approx. 4 passes. | C—approx. 4 passes. |
| Med.—approx. 15% to approx. 20%. | D—approx. 5 passes. | E—approx. 5 passes. | F—approx. 5 passes. |
| Low—approx. 10% or less. | G | H | J—approx. 9–6 passes. |

Possible Combinations:
G
H
J (if sufficient)
J+G
J+H
G+H
H+G

H+J (if sufficient)
G+J (if sufficient)
H+J+H
H+J+G
G+J+G
G+J+H $i^a$+G
$i^a$+H
$i^a$+J (if sufficient)
$i^a$+J+G
$i^a$+J+H $j^b$+G
$j^b$+H
$j^b$+J (if sufficient)
$j^b$+J+G
$j^b$+J+H a i=A or B or C.
b j=D or E or F.

The present invention is not intended to be limited to drawn round wire, for other shapes, such as hexagonal wire, have been successfully drawn using the hexagonal die shape and the method as hereinbefore disclosed. Thus the term wire is used in its generic sense. Further, by using the modified method of the present invention, as disclosed hereinbefore, high strength beryllium fine wire with a drawn wire diameter size of 0.00407 inch and having a length of 750 feet has been successfully drawn.

Although the above description is necessarily of a detailed character, it is to be understood that changes and modifications may be resorted to without departing from the spirit of the invention, as defined in the following claims.

Having thus described my invention, I claim:

1. The method of manufacturing beryllium wire comprising heating beryllium stock to an elevated temperature in the range of from about 600° F. to 900° F., and while maintaining its temperature within said range, subjecting each increment of length of the stock to successive drawing operations, until a first predetermined reduction in the cross sectional area of the stock is obtained, supplying lubricant on the stock in a manner such that each increment is drawn in lubricated condition, thermally treating said drawn beryllium stock to relieve stresses imparted by the preceding drawing operations, and to render it more readily drawable for subsequent drawing operations, and then, while maintaining its temperature within said range, subjecting each increment of length of the stock to successive drawing operations, until a second predetermined reduction in the cross sectional area of the stock is obtained, and supplying lubricant on the stock in a manner such that each increment is drawn in lubricated condition.

2. The method according to claim 1 wherein the lubricant is one which, during the drawing operation and at said drawing temperature, is chemically stable in the presence of beryllium and retains its lubricity.

3. The method according to claim 1 wherein the lubricant is supplied on the stock after said heating to said elevated temperature and prior to drawing.

4. The method according to claim 1 wherein the lubricant is supplied on the stock prior to said heating to said elevated temperature.

5. The method according to claim 4 wherein additional lubricant is supplied on the stock after said heating and prior to drawing.

6. The method as claimed in claim 1 in which the cumulative cyclic reduction in area between thermal treatment is within a range of 0 to 74%.

7. The method according to claim 1 wherein the reduction in cross sectional area for each drawing operation after the thermal treatment is less than that for each drawing operation preceding the thermal treatment.

8. The method according to claim 1 wherein each drawing operation causes relatively high reduction in cross sectional area, and after said second predetermined reduction is obtained, then, in the absence of further thermal treatment, continuing drawing of the stock by successive additional drawing operations, at a reduced reduction in cross sectional area for each of said additional drawing operations.

9. The method according to claim 8 wherein the additional drawing operations are such as to reduce the wire into the fine wire range.

10. The method according to claim 8 wherein the drawing speed for said additional drawing operations is substantially less than employed for the drawing operations prior thereto.

11. The method according to claim 10 wherein the reduced drawing speed is from just above zero to about 20 feet per minute, and the reduced reduction is approximately 10% or less.

12. The method of manufacturing beryllium wire comprising heating beryllium stock to an elevated temperature in the range of from about 600° F. to 900° F. and, while maintaining its temperature within said range, subjecting each increment of length of the stock to a single drawing operation, supplying lubricant on the stock in a manner such that each increment is drawn in lubricated condition, then thermally treating said drawn beryllium stock to relieve the stresses imparted by the preceding drawing operations and to render the stock more readily drawable for subsequent drawing operations, and then repeating the steps which preceded the thermal treating.

13. The method as claimed in claim 12 in which the reduction in area per drawing operation is within a range of 0 to 35%.

14. The method as claimed in claim 13 in which the beryllium stock ranges from 0.750 to 0.500 inch-diameters.

15. A method of manufacturing beryllium wire comprising, beginning with stock within an inch-diameter range of 0.500 to 0.750 inch, heating the stock to an elevated temperature within a range of from about 600° F. to about 900° F. and, while maintaining the stock within said range, subjecting each increment of length of the stock to successive drawing operations, applying lubricant on the stock in a manner such that each increment is drawn in lubricated condition, limiting the reduction during the drawing operation to a total cumulative reduction in cross sectional area of about 35%.

References Cited
UNITED STATES PATENTS

| 436,968 | 9/1890 | Edison | 72—286 |
| 1,008,808 | 11/1911 | Farkas | 72—286 |
| 1,096,866 | 5/1914 | Schinnerling | 72—286 |
| 2,149,436 | 3/1939 | Hadenfeldt | 72—342 |

CHARLES W. LANHAM, Primary Examiner.

H. D. HOINKES, Assistant Examiner.